(12) United States Patent  
Vemuri (10) Patent No.: US 7,716,153 B2  
(45) Date of Patent: May 11, 2010

(54) MEMORY ASSISTANCE SYSTEM COMPRISING OF A SIGNAL PROCESSING SERVER RECEIVING A MEDIA SIGNAL AND ASSOCIATED DATA RELATING TO INFORMATION TO BE REMEMBERED AND PROCESSING THE INPUT SIGNAL TO IDENTIFY MEDIA CHARACTERISTICS RELEVANT TO AIDING USER MEMORY

(75) Inventor: Sunil Vemuri, Santa Clara, CA (US)

(73) Assignee: Reqall, Inc., Moffett Field, CA (US)

( * ) Notice: Subject to any disclaimer, the term of this patent is extended or adjusted under 35 U.S.C. 154(b) by 680 days.

(21) Appl. No.: 11/560,295

(22) Filed: Nov. 15, 2006

(65) Prior Publication Data

US 2008/0114714 A1    May 15, 2008

(51) Int. Cl.
*G06F 17/00* (2006.01)
*G06F 17/20* (2006.01)
*G06F 17/27* (2006.01)

(52) U.S. Cl. .............................. 706/48; 706/20; 706/22

(58) Field of Classification Search .................... 706/48
See application file for complete search history.

(56) References Cited

U.S. PATENT DOCUMENTS 4,984,578 A * 1/1991 Keppel et al. ............... 600/545

6,629,844 B1 * 10/2003 Jenkins et al. .............. 434/169
2002/0111744 A1 * 8/2002 Buegner ....................... 702/19

\* cited by examiner

*Primary Examiner*—Donald Sparks
*Assistant Examiner*—Nathan H Brown, Jr.
(74) *Attorney, Agent, or Firm*—Sonnenschein Nath & Rosenthal LLP (57) ABSTRACT

Methods and systems for enhancing and/or improving one's memory are disclosed. In one embodiment of the invention, a computer-implemented memory assistance system is comprised of a client and a memory assistance server. The memory assistance server includes a signal processing server to receive and process media signals (e.g., audio, video, or photographs) and associated data received from the client. The signal processing server includes a variety of servers or services for processing signals and/or data. Each signal processing server or service identifies characteristics of the received media signal that are relevant to aiding a user in recalling and/or reinforcing an existing memory of a particular event or fact. In addition, the memory assistance server includes presentation logic to generate one or more media clips from the received media signal. Furthermore, the presentation logic determines a time and medium to present one or more media clips to a user so as to aid the user in recalling and/or reinforcing one or more existing memories of a particular event or fact.

28 Claims, 6 Drawing Sheets

FIG. 1B
(MULTI-USER MODE, CLIENT-SERVER SYSTEM)

FIG. 1A
(SINGLE-USER MODE, CLIENT-SERVER SYSTEM)

FIG. 1C
(SINGLE-USER STAND-ALONE SYSTEM)

| OBJECT 1 (GOLF INSTRUCTIONS) | OBJECT 2 (GROCERY LIST) |
|---|---|
| KEYWORDS<br>Backswing<br>Follow through<br>...<br>...<br>...<br>Swing<br>Tee | KEYWORDS<br>Apple<br>Banana<br>Cereal<br>Chicken<br>...<br>...<br>...<br>Safeway<br>Salt<br>Water<br>Yogurt |
| VOICE PROFILES<br>Arnold (Golf Instructor) | VOICE PROFILES<br>Susan (Wife)<br>Greg (Son) |
| DATES & TIMES<br>TUESDAY<br>     6:00 – 9:00 PM | DATES & TIMES<br>ALL DATES<br>     ALL TIMES |
| LOCATION<br>GOLF COURSE | LOCATION<br>ALL |
| OTHER ATTRIBUTES | OTHER ATTRIBUTES |

MEMORY ASSISTANCE SYSTEM COMPRISING OF A SIGNAL PROCESSING SERVER RECEIVING A MEDIA SIGNAL AND ASSOCIATED DATA RELATING TO INFORMATION TO BE REMEMBERED AND PROCESSING THE INPUT SIGNAL TO IDENTIFY MEDIA CHARACTERISTICS RELEVANT TO AIDING USER MEMORY

FIELD OF THE INVENTION

The invention relates generally to methods and systems for enhancing and/or augmenting one's memory. In particular, the invention relates to methods and systems for recording, analyzing, searching, and playing back media signals (e.g., audio and/or video) in a manner that facilitates and enhances one's ability to recall events or facts associated with portions of such signals.

BACKGROUND

Memory is the ability of a person to store, retain, and subsequently recall information, such as events (episodic memories) and facts (semantic memories). Memory researchers have identified a variety of memory problems and have made attempts to label or categorize the memory problems based on their characteristics or symptoms. For example, one category of memory problems—referred to simply as "forgetting"—involves the inability to recall events or facts. For example, when someone hears a song on the radio that he or she is familiar with, and he or she cannot recall the name of the singer at that particular moment in time, he or she is experiencing a memory problem involving "forgetting." There are several memory problems that fall within the category of "forgetting." One such problem is referred to as "transience." Transience involves the fading of memories over time. Another memory problem within the category of forgetting—referred to as "absent-mindedness"—involves shallow processing, for example, forgetting to do things. A third memory problem falling under the category of forgetting is referred to as "blocking." Blocking involves the inability to temporarily recall a fact or event that is known to be within one's memory, such as in the example provided above involving the singer.

Another category of memory problems involves what is referred to as "distortion." Distortion occurs not when memories cannot be recalled, but when memories are recalled incorrectly. For example, "misattribution" is a memory problem that occurs when one correctly recalls a particular event or fact, but attributes it to an incorrect source. "Suggestibility" is a memory problem involving implanting or associating incorrect memories with a proper memory. Finally, a memory problem referred to as "bias" involves distorting or unconsciously influencing a memory.

Memory researchers have suggested some solutions to some of these memory problems. For instance, through memory research, it has been shown that the more time spent "rehearsing" a particular memory, the better the encoding of the memory. This is particularly true if the rehearsal takes place soon after the event. Furthermore, periodically refreshing one's memory about a given event or fact reduces the chance that the memory will be forgotten in time (transience), or will be perturbed due to memory bias. Unfortunately, very few tools that simplify and enhance these memory-improving processes exist.

There are some well-known tools that help people store and recall information. For example, calendar and scheduling software applications exist to help people recall appointments, meetings, anniversaries, birthdays and other time-related events. Similarly, contact management software applications exist to help people recall contact information, such as telephone numbers and addresses for business contacts, friends and family members. However, most of these tools are designed to serve as substitutes for one's memory as opposed to enhancing one's memory. In fact, to a certain extent, depending on such devices to recall certain information (e.g., phone numbers) may actually diminish one's ability to recall the information from his or her memory. Accordingly, new tools are needed to both enhance and augment one's memory.

SUMMARY OF THE DESCRIPTION

Methods and systems for enhancing and/or improving one's memory are disclosed. In one embodiment of the invention, a computer-implemented memory assistance system is comprised of a client and a memory assistance server. The memory assistance server includes a signal processing server to receive and process media signals (e.g., audio, video, or photographs) and associated data received from the client. The signal processing server includes a variety of servers or services for processing signals and/or data. Each signal processing server or service identifies characteristics of the received media signal that are relevant to aiding a user in recalling and/or reinforcing an existing memory of a particular event or fact. In addition, the memory assistance server includes presentation logic to generate one or more media clips from the received media signal. Furthermore, based on an evaluation of a user's situation at any given moment in time, the presentation logic determines the time and medium to present one or more media clips to a user so as to aid the user in recalling and/or reinforcing one or more existing memories of a particular event or fact.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Figure 1A:
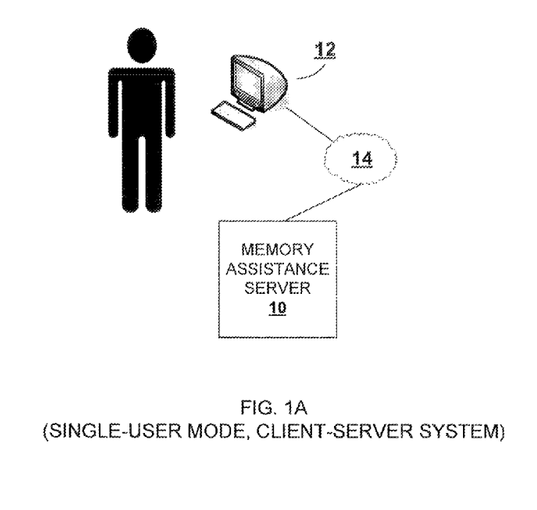
FIGS. 1A-1C illustrate a computer-implemented, client-server-based memory assistance system consistent with embodiments of the invention.
Figure 1B:
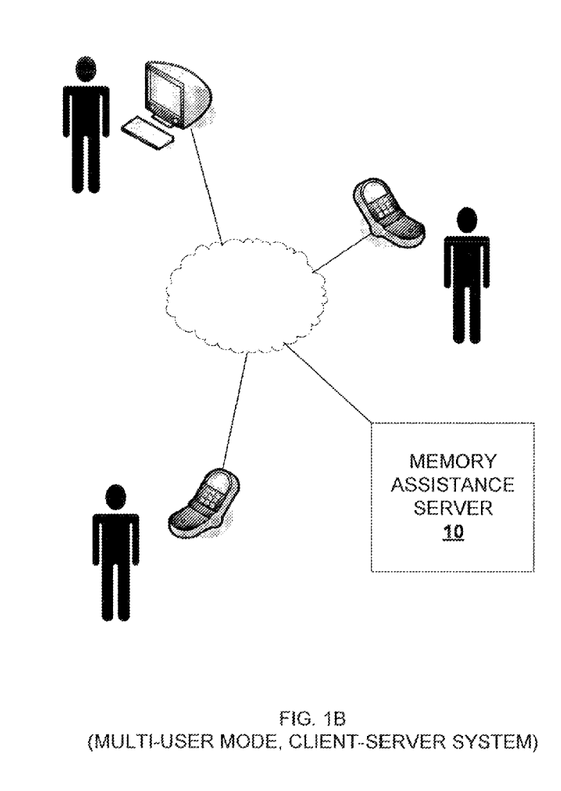
Figure 1C:
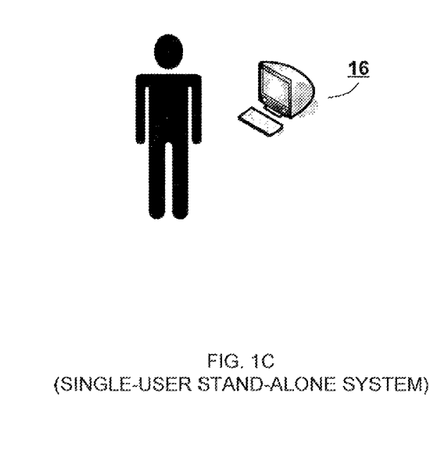

FIGS. 1A, 1B, and 1C illustrate various computer-implemented, memory-assistance systems consistent with embodiments of the invention. In particular, FIG. 1A illustrates a memory assistance server 10 implemented as a client-server system and operating in a single-user mode. FIG. 1B illustrates a memory assistance server 10 implemented as a client-server system and operating in a multi-user mode. Finally, FIG. 1C illustrates a stand-alone memory assistance server 16 operating in single-user mode. As used herein, a "server" is simply a service, and as such, a stand-alone server does not necessarily imply a traditional client-server model is necessary. For example, as illustrated in FIG. 1C, the memory assistance server 16 operates as a stand-alone system without a need for a network.

As illustrated in FIG. 1A, the memory assistance server 10 is coupled to a user's personal computer 12 by means of a network 14. Accordingly, in one embodiment of the invention, a user may interact with the memory assistance server 10 via an application executing on his or her personal computer 12. For example, the user may utilize a conventional web browser to administer, configure, and/or otherwise interact with the memory assistance server 10. A user may also use a special purpose application (other than a conventional web browser) to interact with the memory assistance server 10. As described in greater detail below, a wide variety of software applications and client devices other than personal computers may be used to interact with the memory assistance server 10. For example, while away from his personal computer 12, a user may interact with the memory assistance server 10 via a conventional land-line phone, or wireless mobile smart phone.

As illustrated in FIG. 1B, in one embodiment of the invention, the memory assistance server 10 operates in a multi-user mode. As described in greater detail below, a user generally interacts with the memory assistance server 10 by communicating one or more media signals (e.g., audio, video, or photograph signals) to the memory assistance server 10, and then later, having the memory assistance server 10 present or play back one or more media signals that have been strategically selected by the memory assistance server 10 to address a particular memory problem. In multi-user mode, the memory assistance server 10 may receive a media signal generated during a conversation between several persons. For example, one or more persons may activate or otherwise establish a connection to the memory assistance server 10 by means of a mobile phone, personal computer, or other communication device, such that a conversation between the users is communicated in real time (e.g., as it occurs) to the memory assistance server 10. Alternatively, one of the users may capture the media signal first, for example, by storing the media signal locally in a flash memory, a fixed disk drive, or other local storage component. Then, at a later time, the user can initiate the transfer of the recorded media signal to the memory assistance server 10.

As illustrated in FIG. 1C, the memory assistance server 16 may execute as a stand-alone application on a user's device, such as a personal computer or smart phone. When executing in a stand-alone mode on a personal computer, a user may interact with the memory assistance server 16 via the personal computer's user interface and input devices (e.g., keyboard, mouse, camera, microphone). In one embodiment of the invention, a user may transfer media signals or media files to the stand-alone application via a mobile device connected to the computer by means of a wireless connection (e.g., WiFi® or Bluetooth®), or a wired connection. Alternatively, the user may connect to the personal computer by means of a land-line phone, mobile phone, or other like-kind communication device.

As described in greater detail below, there are a wide variety of mechanisms for capturing a media signal and communicating the media signal to the memory assistance server 10. For instance, in the single-user mode of FIG. 1A, the user may actively issue directives to the memory assistance server 10 by speaking into a microphone attached to his or her personal computer 12. Similarly, a user may use a video or photographic camera to capture video or photographs, which in turn, can be communicated to the memory assistance server 10 either directly (e.g., if the capture device includes a supported means of communication, such as wireless networking support), or indirectly by coupling the capture device to a network-connected computer. A user may capture a lecture, a conversation or other social interaction on a video camera or audio recording device, and then upload the captured recording to the memory assistance server 10.

The memory assistance server 10 is designed to address a wide range of memory problems. Accordingly, the user's interaction with the memory assistance server 10 may vary with the particular type of memory problem being addressed. In general, however, a user interacts with the memory assistance server 10 by communicating recorded media signals (e.g., audio, video, photographs) to the memory assistance server 10 over a network, and then at a later time, viewing or listening to media clips from the media signal that have been selected by the memory assistance server 10 as being particularly helpful in assisting the user in addressing a particular memory problem. In one embodiment of the invention, the selection of the particular media clips to be presented, the length and number of media clips to be presented, the time at which the media clips are to be presented, and the presentation medium and/or play back method (e.g., phone, computer) are all dynamically determined by the memory assistance server 10 depending upon the particular memory problem being addressed and the current context. In determining the current context, the memory assistance server 10 may process a wide variety of real-time and non-real-time data including (but not limited to): the current time; date; current or past location of the user; proximity of the user to another person; calendaring information such as past, current, or future scheduled appointments or meetings; persons with whom the user is scheduled to meet or speak with; as well as events such as birthdays or anniversaries.

Figure 2:
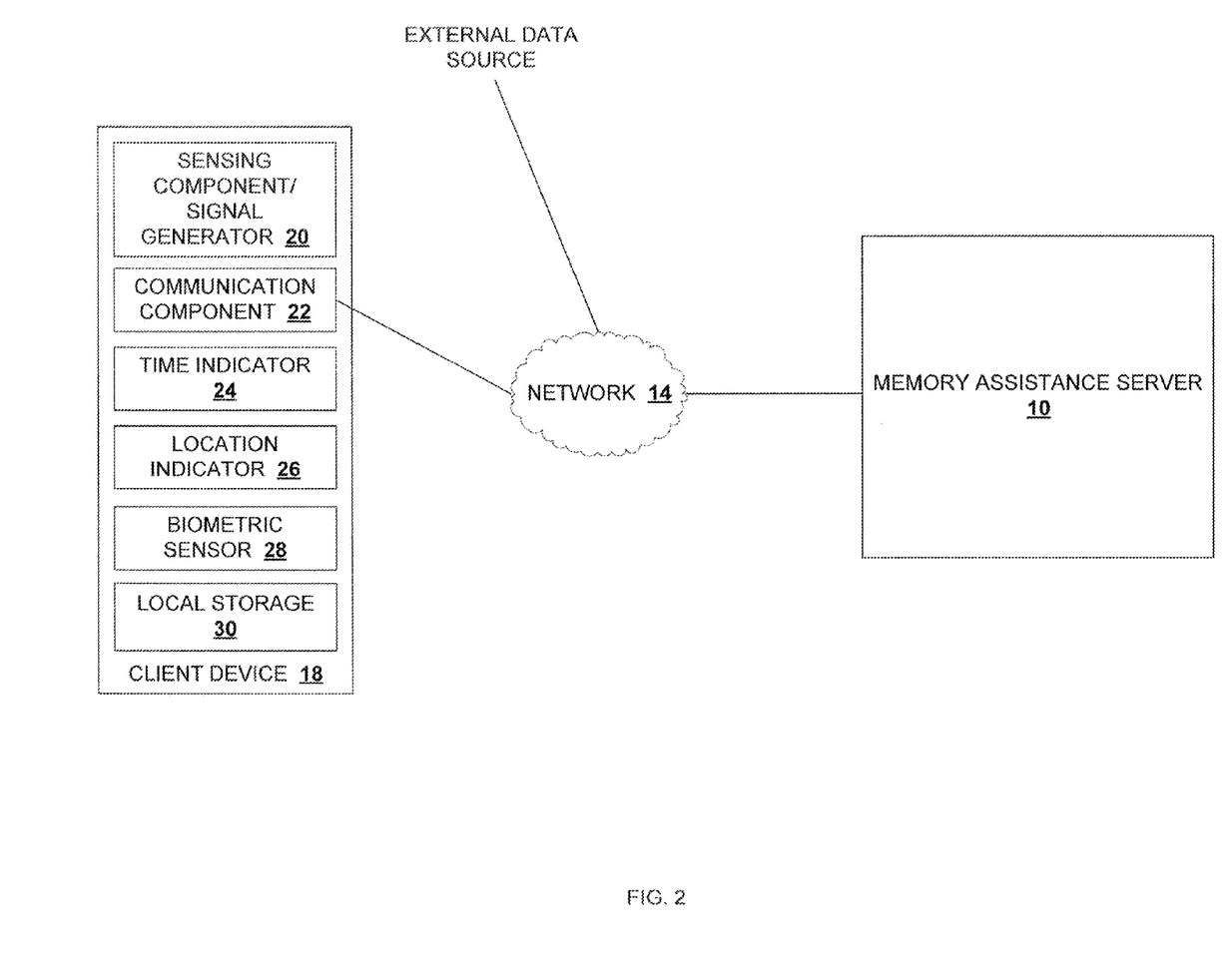
FIG. 2 illustrates a block diagram of an embodiment of a memory assistance system, showing some of the basic functional components of a client device that may be used to interact with a memory improvement server.

FIG. 2 illustrates a block diagram of a client device 18 used to interact with a memory assistance server 10, according to one embodiment of the invention. It will be appreciated by those skilled in the art that the functional components of the client device 18 as illustrated in FIG. 2 are provided as examples, and that various client devices consistent with the invention may have various subsets of those functional components shown in FIG. 2, but may or may not include all of the functional components illustrated as part of the client device 18 in FIG. 2. For example, in one embodiment of the invention, the client device 18 may be a land-line phone or any electronic or computing device that has suitable input and communication mechanisms. Accordingly, the sensing component 20 may be a telephone's conventional microphone, and the communication component 22 may be the circuitry in a telephone used to establish communications sessions. Alternatively, the client device 18 may be a wireless, mobile phone. In one embodiment, the client device may be a so-called smart phone. As used herein, a smart phone is a phone capable of executing standalone software applications designed and written for the particular operating system of the smart phone. Accordingly, many smart phones include some functionality commonly attributed to personal digital assistants (PDAs). For example, many smart phones have software for storing calendar events and personal contact information. In addition, many, but not all smart phones include built-in cameras for capturing video or photographs. Typically, but not always, a smart phone executes a specialized operating system, such as Linux®, Palm OS®, Symbian® or a version of Windows Mobile®. In one embodiment of the invention, portions of the invention may be implemented as a standalone software application for execution on a smart phone with one of the above operating systems. In an alternative embodiment of the invention, the functionality of the invention may be implemented as an add-on module that attaches to a communication device. For example, the add-on module may be an attachment to a land-line phone, mobile phone, or smart phone.

In addition, the client device 18 may be a computer-based phone, such as a softphone. A softphone is a software application that executes on a computing device (e.g., a general purpose computer or a communication device) and enables the computing device to operate in much the same way as a traditional land-line phone. Typically, a softphone encapsulates a voice signal into data packets that are sent over the computer's data network connection. Perhaps the most common type of softphone is a Voice over Internet Protocol (VoIP) phone. A VoIP phone utilizes conventional networking protocols, such as TCP/IP and/or UDP to carry voice data over a conventional data network.

As illustrated in FIG. 2, the client device includes one or more sensing components or signal generators 20 for capturing a media signal. For example, the signal generator 20 may be a conventional microphone, video camera for capturing streaming images, photographic capturing device for capturing photographs or still images, or a combination of such devices.

In addition, the client device 18 includes a communication component 22 for communicating the captured media signal to the memory assistance server 10. The communication component 22 may provide support for any number of conventional wired or wireless network and/or communication protocols for establishing communication sessions between the client device 18 and the memory assistance server 10. For example, the communication component 22 may support wired (e.g., Ethernet port, USB port, or Fire Wire® port) or wireless (e.g., 802.11 or WiFi®, Bluetooth®, or infrared) communications. The communication component may support real-time communications, such that a media signal generated by the sensing component 20 is communicated to the memory assistance server 10 in real lime or near real time (e.g., as it is generated). In addition, in some cases, the communication component is capable of communicating previously captured data stored in local storage 30.

The client device 18 also includes a time indicator 24, which may be as simple as an internal clock or a network-updated clock, for indicating the time. In one embodiment, the time indicator 24 generates date/time information that is embedded in media signals generated by the sensing component 20, such that the memory assistance server 10 can analyze date/time information associated with media signals generated by the client device 18. Accordingly, the date/time may indicate that another characteristic of the media signal (e.g., text included in audio) is relevant because it occurred at a particular time. For example, a user may use the memory assistance server's 10 search component (described in greater detail below) to query for all media clips that include certain key words, spoken within a particular time period.

In addition, the client device 18 may include a location indicator 26 that generates location information. The location indicator 26 may use global positioning system (GPS) technology to determine the location of the client device 18, particularly when the client device is in an outdoor location. Various other technologies might be used to determine the location of the client device when it is outdoors and/or indoors. For instance, the location indicator 26 might use a radiolocation, triangulation or trilateration technology commonly found in mobile phones, WiFi® or Bluetooth® devices, for determining location information. In addition, one or more of the above technologies may be used with another radio frequency (RF-based) communication devices including a device using the Citizens' Band (CB).

After the client device captures the location information, the location information may be embedded into a media signal generated by the sensing component 20, or communicated separately to the memory assistance server 10. In any case, the location information provides the memory assistance server 10 with additional data for determining the potential relevance of a portion of a media signal. That is, the memory assistance server 10 may determine that the location at which a media signal is generated, based on location information associated with a particular portion of a media signal, adds to its relevance as a potential memory trigger for a particular event or fact. Again, using the search component of the server 10, a user may query the server 10 for all media clips captured at or near a particular location. Furthermore, as described in greater detail below, the memory assistance server 10 may use location information indicating a user's current location to determine that a particular media clip should be presented to the user.

The location indicator 26 component may also allow the client device 18 to detect other persons or objects within proximity of the user. For example, in one embodiment of the invention, the location indicator 26 may include a sensor for sensing other hardware devices within a given range of the client device 18. Accordingly, in one embodiment of the invention, a Bluetooth® transceiver in the client device 18 may periodically poll other devices within range of the client device 18, for example, by issuing a simple request asking another device to identify itself. Accordingly, if another user's hardware device responds to the client device's request, the client device 18 attempts to identify the identity of the responding device, or a person associated with the responding device. For example, if the responding device provides a phone number, or other personal information of the device owner, the client device 18 may perform a lookup operation to determine if the user of the client device has contact information associated with the identity of the responding device. In another embodiment of the invention, a centralized server may provide the proximity information. For example, data received from a mobile phone service provider may indicate the proximity of the user to another person in the user's contact list. Accordingly, the proximity information may be passed along to the memory assistance server, and used in determining whether a particular media clip should be presented to the user at a later time as a memory trigger.

Depending in part on the particular memory problem being addressed, the time, location and proximity information may be used by the memory assistance server 10 to identify portions of a media signal (e.g., video or audio signal) that have characteristics best suited for use as a memory trigger to assist the user in recalling a particular event or fact. For example, if a particular media signal is generated in a particular location, or at a particular time, or in the proximity of a particular person, the particular location, time, or proximity information may indicate that portions of the signal occurring at that particular time and location may be particularly useful in aiding a person to recall a particular fact or event, if the particular portions of the signal are presented to the user. Furthermore, it may be useful to present one or more media clips captured in the proximity of a particular person to a user at a future time, when the user is again within the proximity of the person, or when calendaring information indicates the user will be meeting with the particular person.

In one embodiment of the invention, the client device 18 also includes a biometric sensor 28 for generating a biometric signal. Like the time information and location information, the biometric signal provides the memory assistance server 10 with additional data for determining whether a portion of a media signal is relevant or useful, if presented as a memory trigger, in aiding a person's memory of a particular fact or event. For example, the client device 18 may include a biometric sensor 28 (e.g., galvanic skin response sensor). If a mobile phone with a built-in galvanic skin sensor communicates to the memory assistance server 10 both an audio signal from a conversation between a user and another person and biometric information generated by a skin sensor, then the signal processing logic of the memory assistance server 10 can analyze the audio signal and the biometric information to determine portions of the audio signal where the biometric information changes. Such changes in the biometric information, particularly deviations from the user's normal biometric levels, may indicate particular moments in the conversation that are relevant in triggering memories of the content of the conversation. For example, such changes in the biometric information may indicate that a user has entered into a particular state (e.g., mental or emotional state) or is experiencing a particular condition. Accordingly, if portions of the conversation are played back to the user at a later time, those portions of the conversation when the biometric information changed significantly may enable the user to better recall the content and details of the conversation. Those skilled in the art will appreciate the usefulness of the biometric information, and the algorithms that may be used, in determining significant memory triggering events. In addition to a galvanic skin sensor for detecting excitation, other sensors may be used to detect the following information to be used in determining the relevance of a particular media clip: a speaker's mood, a speaker's volume, a speaker's voice, a speaker turn-taking rate, a speech rate, a person's gaze, a person's posture, a person's heart rate, a person's blood glucose level.

Finally, the client device 18 includes a local storage component 30 for storing data, such as media signals generated by the sensing component 20. As indicated above, in one embodiment of the invention, data generated by the client device 18 may be communicated in real time (e.g., as it is generated). Alternatively, data may be stored locally, as it is generated, and then communicated to the memory assistance server 10 at a later time. Furthermore, in one embodiment of the invention, after communicating a media signal to the memory assistance server 10 with one client device, a different client device may be used to receive and/or play back media clips from the memory assistance server 10. For example, a personal media player device that is capable of presenting various media files, such as an iPod®, may be used to play back media clips.

In one embodiment of the invention, the memory assistance server 10 may be coupled to an interactive voice response (IVR) server. Accordingly, one method of communicating with the memory assistance server 10 may be as simple as connecting to the IVR server by dialing a particular telephone number via a conventional dial pad or touch-tone buttons of a land-line phone. In such a case, the audio signal communicated to the memory assistance server 10 is captured at the IVR and redirected to the memory assistance server 10. With other client devices (e.g., a voice recording device), a user may capture a media signal (e.g., an audio conversation) on the client device 10 first, and then subsequently submit the captured signal to the memory assistance server 10.

Figure 3:
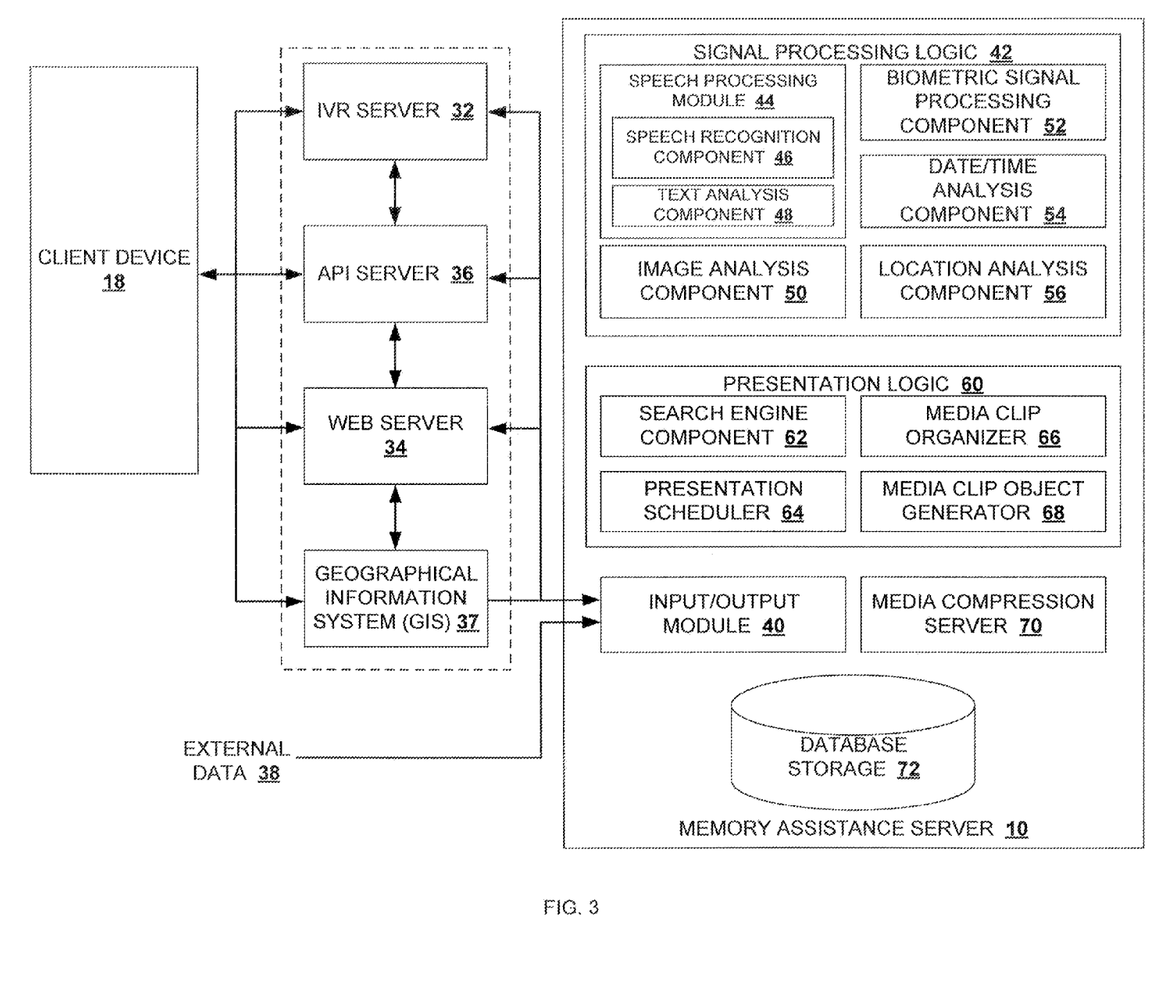
FIG. 3 illustrates a functional block diagram of a memory assistance server, in accordance with an embodiment of the invention.

FIG. 3 illustrates a functional block diagram of a memory assistance server 10, according to an embodiment of the invention. As illustrated in FIG. 3, the memory assistance server 10 is configured with an input/output module 40 for sending and receiving a variety of data, to include media signals (e.g., audio, video, or photographs) as well as other data. The memory assistance server 10 may be configured to receive such media signals directly from a client device 18. Alternatively, the memory assistance server 10 may be configured to communicate with one or more other servers, such as an interactive voice response (IVR) server 32, or a web server 34. In one embodiment of the invention, an application programming interface (API) server 36 may facilitate a common interface and provide common function calls to communicate data between a client 18, an IVR server 32, a web server 34 and a memory assistance server 10. Accordingly, it will be appreciated by those skilled in the art that the memory assistance server 10 may be implemented as a distributed system where different hardware components provide different functions. In addition to receiving and sending media signals, the memory assistance server 10 may be configured to send and receive other data. For example, the memory assistance server 10 may receive data from external data sources 38, such as a calendaring or contact management application executing on a user's personal computer or smart phone.

In one embodiment of the invention, the memory assistance server 10 can be thought of as having two primary levels of logic—a first level of logic for analyzing input signals as they are received to identify signal characteristics of interest, and a second level of logic for organizing media clips, determining what media clips should be presented, when the clips should be presented, and in what manner the clips should be presented. As described herein, the first layer of logic is referred to as the signal processing logic 42, and the second layer of logic is referred to as the presentation logic 60. Those skilled in the art will appreciate that the logic abstraction described herein is primarily for the sake of making the description of the various functions easy to understand. Accordingly, in various alternative embodiments of the invention, one or more functions described herein as being associated with one logic layer (e.g., the signal processing logic 42) may or may not be a part of, or associated with, a particular layer of logic.

Figure 4:
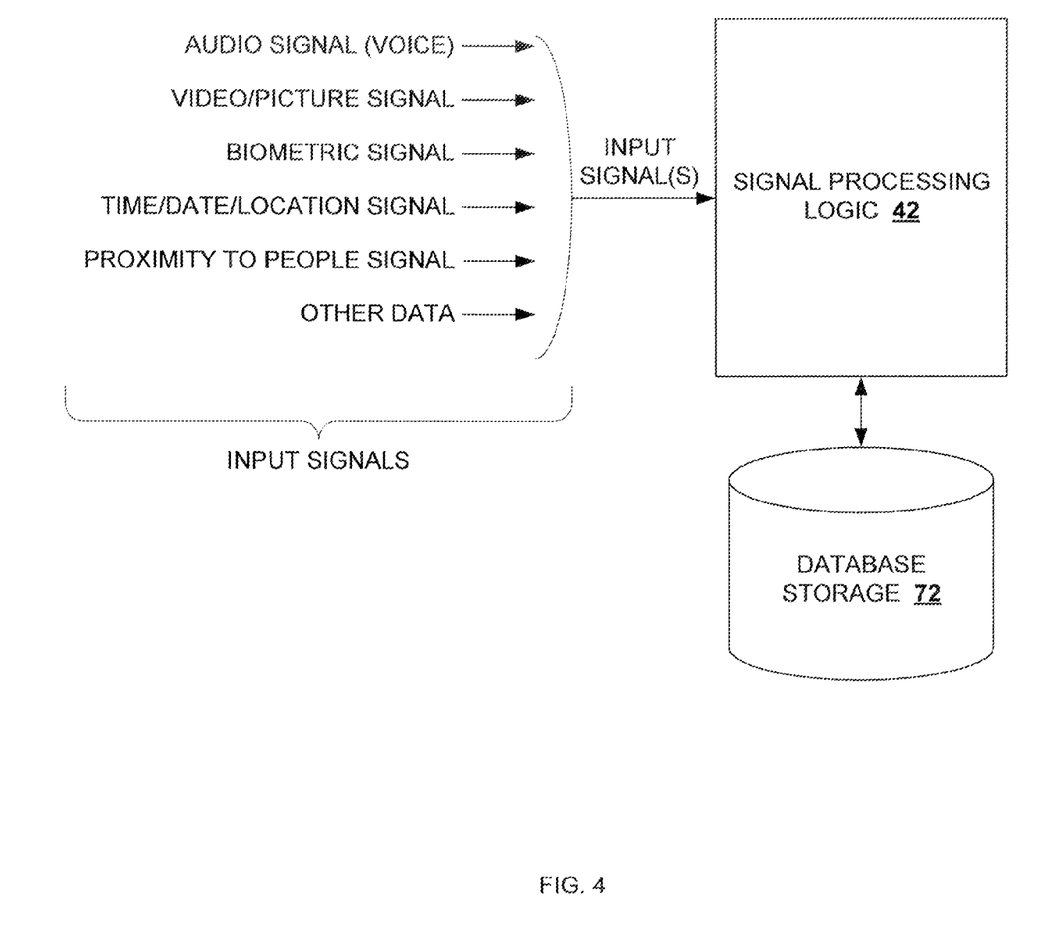
FIG. 4 illustrates a functional block diagram of the various inputs received at and processed by a memory assistance server, according to an embodiment of the invention.

The signal processing logic 42 is configured to analyze media signals, and external data, so as to determine what portions of each signal have specific attributes or characteristics that indicate a high likelihood that the portion of the signal is a good memory trigger for a particular event or fact. A variety of signal characteristics and external data may be analyzed in determining the relevant portions of a media signal to be played back as a memory trigger for solving a particular memory problem. For example, as illustrated in FIG. 4, the memory assistance server 10 may receive, as input, data in the form of audio signals, video signals, photographs, biometric signals, time/date/location signals, signals indicating the proximity of the user to a particular location or the proximity of the user to one or more other persons, as well as other externally generated data. Accordingly, each of the input signals may be individually and/or collectively analyzed to determine whether the signal or signals represent a source of information that may be useful as a memory trigger in solving a particular memory problem.

One type of information that is often useful for solving memory problems is audio information. For instance, hearing audio clips from a previously recorded conversation, lecture, or dictated reminder (e.g., a note to one's self) can often help one recall a memory (e.g., an event or fact) associated with the audio clip. In addition, repeatedly hearing an audio clip may help to biologically encode the memory so it is retained over a longer time period, and more easily recalled in the future. Accordingly, the signal processing logic 10 includes a speech processing module 44. Generally, the speech processing module 44 analyzes audio signals to identify keywords in speech captured in the audio signal. The speech processing module 44 includes a speech recognition component 46 and a text analysis component 48. The speech recognition component 46 uses speech recognition algorithms to identify spoken words in speech included in an audio signal, and convert the spoken words to textual words. The text analysis component 48 works in conjunction with the speech recognition component 46 to identify keywords and/or key phrases recognized by the speech recognition component 46. By identifying keywords and/or key phrases, the speech processing module 44 can associate portions of a media signal with one or more categories or topics, and thereby associate media clips with particular memory problems.

For example, in one embodiment of the invention, each particular memory problem may have one or more predefined media objects associated with the memory problem. The concept of media objects is described in greater detail below with respect to the description of FIG. 5. The media objects may be system-defined, or alternatively, a media object may be user-defined. Each media object may have one or more media characteristics associated with the media object, such that any portion of a media signal having corresponding characteristics is selected as a potential media clip to solve the associated memory problem. For example, a media object for a memory problem associated with remembering a grocery list may be associated with several keywords, where each keyword corresponds with a potential grocery list item. Accordingly, as the speech processing module identifies the keywords associated with the grocery list media object in a particular media signal, the memory assistance server 10 may generate a media clip from the portion of the media signal including the keyword or words. Alternatively, the portion of the media signal may be tagged, for example, with meta-data to indicate that the portion of the media signal includes the keywords and/or is associated with a topic or category associated with the keywords.

The text analysis component 48 may identify portions of a media signal that are associated with particular topics, based on the identification of one or more keywords or phrases in close proximity (in time) to one another. For example, if the word "milk" appears just before or just after the words "super market", then the particular portion of the audio signal including those key words may be associated with the topic "grocery list items."

In addition to analyzing audio signals, the signal processing logic 42 includes an image analysis component 50 that is configured to analyze video and/or photographs. Accordingly, the image analysis component 50 may be configured to identify attributes or characteristics of the video and/or photographs that indicate that the image or images may be particularly useful in addressing a particular memory problem. For example, the image analysis component 50 may use facial recognition algorithms to identify people within images. By presenting portions of a video, or particular photographs, that include images of a particular person, memories associated with that person may be refreshed or recalled. The image analysis component may, for example, analyze images to determine a location in which a person is looking. If, for example, a person is gazing directly at someone or something, this might indicate that particular portion of the media clip is relevant in solving a particular memory problem. Similarly, if a person appears to have a blank look on his face, as if he is "staring into space" in a particular portion of a video image, it may indicate the person is not paying close attention. Consequently, that portion of the video signal may be useful if replayed to the user. A wide variety of algorithms may be used to select the particular portions of a video image that are relevant, and often the selection will depend on the particular memory problem being addressed. Accordingly, video or pictures may be presented to a user as a memory trigger for a particular memory of an event or fact.

In one embodiment of the invention, the signal processing logic 42 includes a biometric signal processing component 52. In general, the biometric signal processing component 52 identifies biometric information that may indicate that a particular portion of a signal includes information that is useful in solving a particular memory problem. For example, the biometric signal processing component 52 may process biometric signals to identify points in time where the change in a biometric signal indicates the emotional state of a person has changed. Such changes may indicate that a portion of a signal is a good candidate for a memory trigger. Consequently, a media clip may be selected based on identifying changes in biometric information. That is, a portion of a media signal may be selected based on a change in biometric information perceived from a biometric signal associated with the media clip. Again, a wide variety of algorithms may be used to determine when the biometric information indicates that a portion of a media signal may be particularly relevant in solving a particular memory problem, and in general, the algorithm used will be dependent upon the particular memory problem being solved.

The biometric signal processing component 52 may also include speaker identification logic for analyzing audio signals to detect or identify a speaker associated with a particular voice signal. For example, the biometric signal processing component 52 may use voice profiles associated with individual users of the system to identify and associate a particular portion of an audio signal with a particular person. Accordingly, the association of the particular person with the spoken text can be used to determine the potential relevance of the media signal to a particular memory problem. For example, a user may want to identify all audio conversations including the voice of a particular person, such as a professor. The user can associate the professor's voice profile with a media object associated with a particular memory problem. As the memory assistance server 10 identifies media signals including the professor's voice, the memory assistance server 10 will generate media clips associated with the media object for the particular memory problem. Accordingly, the user can later select to hear all media clips with the professor's voice.

In one embodiment of the invention, the signal processing logic 42 includes a date/time analysis component 54, as well as a location analysis component 56. Date/time and location information may be received at the memory assistance server 10 as separate input signals, or alternatively, date/time and location information may be embedded in another signal, such as an audio signal, a video signal, or a photograph. The date/time analysis component 54 and/or the location analysis component 56 analyze date/time and location information, respectively, to determine whether the date/time and/or location at which events occurred indicate that a portion of the media signal may be a good memory trigger for a particular fact or event. For example, if the memory assistance server 10 is configured to generate a series of clips to aid in encoding memories associated with a class lecture, the memory assistance server might select media clips that were captured during the time, and at the location where, the lectured occurred.

In one embodiment of the invention, the location analyzer component 56 may utilize an external or internal geographic information system (GIS) 37. As illustrated in FIG. 3, the system includes an external (GIS), however, it will be appreciated by those skilled in the art that the system may be implemented with an internal GIS. In any case, the location analyzer component 56 may issue queries to the GIS to determine relevant geographical information. For example, if the location analysis component 56 receives coordinates along with, or associated with, a particular media signal, the location analysis component 56 may query the GIS to determine specific geographical information. This may be done to determine characteristics of a media signal. For example, the location analyzer component 56 may send a query to the GIS to determine geographical characteristics of a particular media signal, such as, whether the media signal was generated in the proximity of a location, or type of location, such as a particular type of business. For example, the location analysis component 56 may query the GIS with the coordinates to determine if the media signal was generated at or near a particular type of business, such as a grocery store or a golf course, or any other potentially relevant type of business. Accordingly, the GIS provides rich set of features for converting simple geographical coordinates into meaningful geographical information. In addition, the GIS may be queried with current coordinates of a user, to determine whether one or more media clips should be presented to the user, based on his current location. For example, if the location analyzer component 56 receives information from a client device indicating that the client device is located at particular geographical coordinates, the presentation logic 60 may query the GIS to determine whether the particular geographical coordinates match geographical information associated with a particular memory problem. For example, the GIS may be queried to determine if the user is within close proximity of a type of business, such as a grocery store. Accordingly, if the user's current location is relevant with respect to a particular memory problem, the memory assistance server 10 may attempt to present one or more media clips to the user for that particular memory problem. For example, if current geographical coordinates indicate that the user is within close proximity to a grocery store, the memory assistance server 10 may automatically establish a connection with the user's client device (e.g., mobile phone), and play back one or more media clips associated with a grocery list.

The second layer of logic involves what is referred to herein as presentation logic 60. The presentation logic 60 facilitates organizing and presenting signal data to a user in a manner suited to address one or more particular memory problems. For instance, if a user is experiencing a memory blocking problem, where the user simply cannot recall an event or fact, even though the user knows he or she has knowledge of that event or fact, the user may use the search engine component 62 to find an appropriate memory trigger. The search engine component enables a user to specify search parameters that correspond with characteristics of media signals, and then perform searches to locate media clips having characteristics that match the user-specified search parameters. For example, a user may Issue a query (e.g., via a web interface) to locate all media clips captured at a particular location, during a particular time, and including a particular keyword or key phrase. The search engine component 62 performs a search of media stored in database storage 72 to identify those portions of any previously captured and stored media signals that have characteristics that match the search parameters. Accordingly, the memory assistance server 10 will present the user with the media clips that match the search.

In addition to enabling active searches for media clips, the presentation logic 60 includes a presentation scheduler 64 for automatically scheduling the presentation of media clips to the user. The presentation scheduler 64 may present media clips to the user based on a user-defined schedule, or alternatively, a system-defined schedule. For instance, a user may configure the memory assistance server 10 to present media clips having certain characteristics at a particular time of day. For example, if a user would like to review media clips from a weekly lecture, the user may enable the server 10 to select clips based on certain characteristics, and then schedule those clips to be played back to the user every morning during the user's drive to work. The presentation scheduler may handle the means and method by which the media clips are presented (which may he user- or system-defined). Accordingly, if the user indicates that the he or she would like the media clips presented over the phone, the memory assistance server 10 may establish a communication session with the user's mobile phone, and then play back media clips. Alternatively, the server may create a podcast, or similar presentation, and automatically download the podcast to the user's media playing device.

In addition to user-defined schedules, the presentation scheduler may automatically schedule the presentation of media clips to the user. For instance, the memory assistance server 10 may analyze a variety of input data on a real-time basis to determine whether to present media clips to the user. In one embodiment of the invention, the presentation logic 60 may analyze calendar information to determine a user's daily schedule. If the user has scheduled a meeting on a particular topic, or with a particular person, or group of persons, the presentation logic will attempt to identify any media clips that may be associated with the particular topic of the meeting, or the persons or group. Accordingly, the presentation scheduler can play back or present potentially relevant media clips from past interactions that the user had with the person or group.

In another example, the presentation logic 60 may analyze the current location of the user in order to determine whether a media clip or clips should be presented to the user. For example, if the user has established a grocery reminder list, the presentation scheduler 64 may initiate a communication session with the user by establishing a connection to the user's mobile phone, and then play back media clips associated with the user's grocery list. It will be appreciated by those skilled in the art that the presentation schedule may use a wide variety of means and methods for communicating data to the user. For instance, the memory assistance server 10 may communicate data by phone or computer network, including email and text messaging (including SMS, MMS as well as by instant messaging services).

The presentation logic 60 includes a media clip organizer 66. In one embodiment of the invention, the media clip organizer facilitates ranking or grouping of media clips, based on their overall relevance. Accordingly, if a fixed number of media clips are to be presented at a particular time, those media clips that have been assigned the highest priority by the media clip organizer 66 may be presented. In addition, the media clip organizer may assist in the generation and storage of meta-data associated with the key characteristics of media signals, as identified by the signal processing logic 42. For instance, as media signals are initially received and analyzed, key characteristics may be identified. The media clip organizer 66 may generate meta-data and store the meta-data in a manner that enables later searches to be performed based on the key characteristics.

The presentation logic also includes a media clip object generator 68. The media clip object generator 68 facilitates the generation of media clip objects for media clips. As described in greater detail below in connection with the description of FIG. 5, a media clip object is a data object having associated parameters that define the characteristics that make a particular portion of a media clip relevant to a particular memory problem. For instance, a media clip object may be defined for a grocery list. Accordingly, the grocery list media clip object may have parameters defined for it, which determine the characteristics to be included in a media signal that is to be associated with a grocery list. The parameters may include keywords associated with food items, or locations where a person is likely to make remarks about a grocery list, such as the user's home or kitchen.

Finally, in one embodiment of the memory assistance server 10, a media compression server 70 may be included. Accordingly, the media compression server 70 compresses media signals received by the input module 40 of the memory assistance server 10 prior to storing the media signals in the database storage 72.

Figure 5:
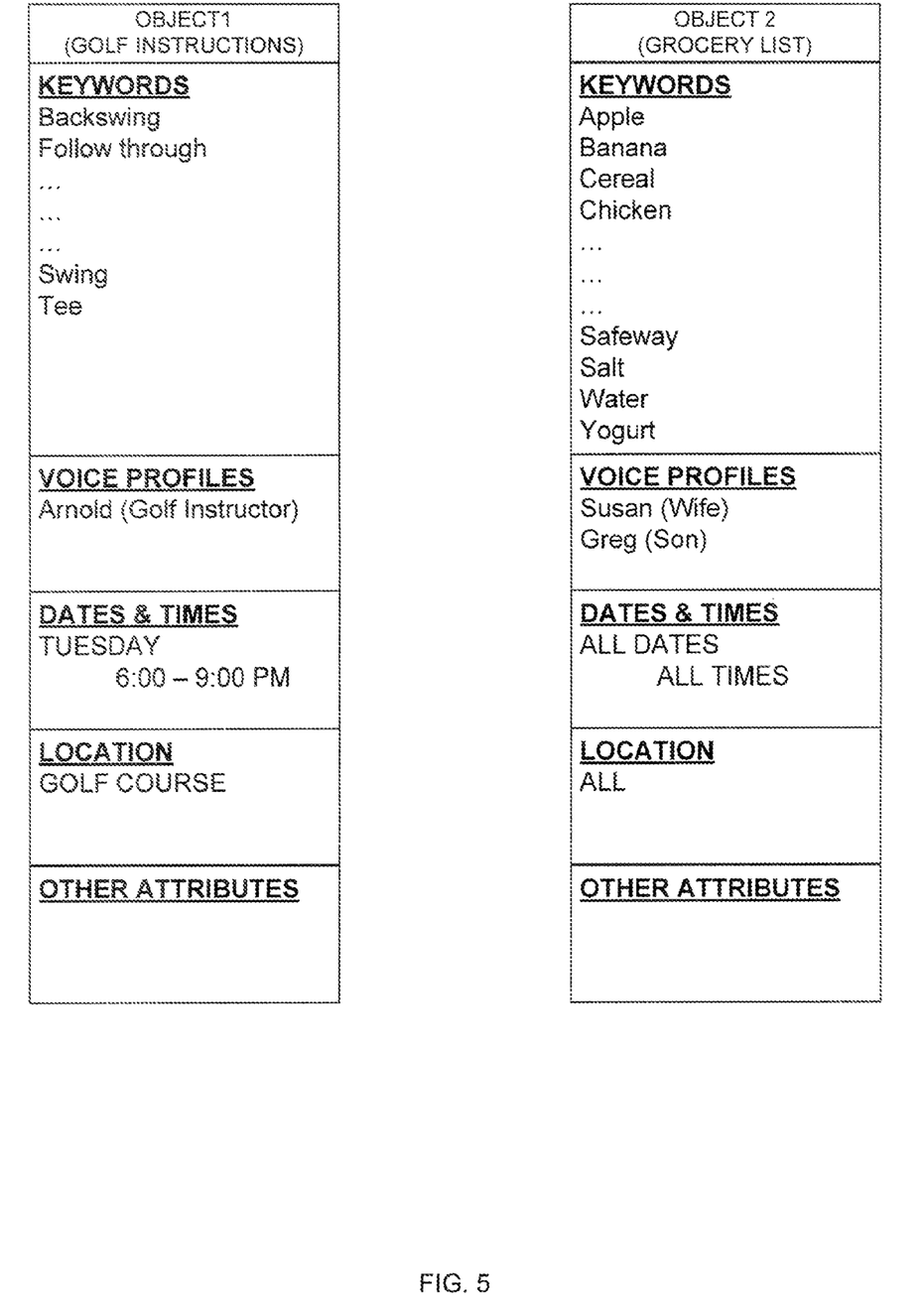
FIG. 5 illustrates a data structure used as a data container and/or query mechanism for storing and searching media clips, according to an embodiment of the invention.

FIG. 5 illustrates examples of a predefined media clip object, according to an embodiment of the invention. A media clip object, such as object 1 and object 2 shown in FIG. 5, is a data structure used by the memory assistance server 10 to identify potentially relevant portions of a media signal. For example, each media object may be defined with parameters specifying media signal characteristics that, if present in a particular portion of a media signal, make that particular portion of the media signal relevant to a memory problem associated with the media clip object. Accordingly, as illustrated in FIG. 5, the example media clip object 1 is configured to address a memory problem associated with golf instructions, while media clip object 2 is associated with a grocery list. For example, media clips generated based on the characteristics defined by media clip 1 ("GOLF INSTRUCTIONS"), may be used to refresh a user's memory of instructions provided by a golf instructor. Similarly, media clips generated based on the characteristics defined by media clip 2 ("GROCERY LIST") may be used to refresh a user's memory of items that he or she needs to purchase next trip to the grocery store.

As illustrated in FIG. 5, object 1 for "GOLF INSTRUCTIONS" includes characteristics such as keywords, voice profiles, dates and times, location, and possibly others. Accordingly, the characteristics can be logically combined to select portions of media clips that are particularly relevant to helping a user remember events or facts related to golf instructions. For example, the signal processing logic 42 or presentation logic 60 may select a portion of a media signal to be associated with object 1 if the signal has characteristics set forth by the parameters defined by object 1. Similarly, object 2 is a media clip object for a "GROCERY LIST." Accordingly, media signals captured based on satisfying parameters specified by object 2 may be used to help a user remember his grocery list. Each media clip object may be predefined by an administrator of the system, or by a user of the system. Furthermore, in one embodiment of the invention, the server 10 is configured to monitor how users interact with various media clips. Accordingly, the server 10 may automatically alter one or more aspects of a media clip based on user behavior.

Referring again to FIG. 5, a variety of keywords are shown to be associated with the media object for "GOLF INSTRUCTIONS." Accordingly, when a media signal is processed by the signal analysis server, the speech processing component will attempt to identify words or phrases from the media signal that match one or more keywords or key phrases associated with the media clip object. If the word "swing" is identified in the media signal, a media clip may be generated. The media clip may include a portion of the media signal before and/or after the identified keyword. A user may recall the media clip by selecting to present media clips associated with the media object for "GOLF INSTRUCTIONS." For example, if the user is on the golf course, the user may use his mobile phone to communicate with the memory assistance server, and then select to play previously captured media clips associated with the media clip object for "GOLF INSTRUCTIONS." The media clips presented to the user may help the user recall golf instructions communicated to the user at a previous golf instruction lesson.

In addition to keywords, other characteristics of a media signal may be used to identify and generate relevant media clips. For example, in one embodiment of the invention, the biometric signal processing component 52 of the memory assistance server 10 may have speaker identification capabilities. Accordingly, a user may associate particular voice profiles with different media clip objects. For example, in the case of the media clip object for "GOLF INSTRUCTIONS" a user may select to associate the voice profile of his or her golf instructor. When the signal processing logic 42 of the memory assistance server 10 identifies a portion of a media signal including the golf instructor's voice, the memory assistance server 10 may generate a media clip from that portion of the media signal.

Other characteristics associated with media clips are date, time, and location. A user, or a system administrator, may define a particular date and/or time that is relevant with respect to a particular media clip object. If the user knows that his or her golf lessons always occur on Tuesday or Thursday, for example, the user may elect to associate those days with the media clip object for "GOLF INSTRUCTIONS." Accordingly, those days will be used to identify potentially relevant media clips. Similarly, the user's proximity to a person or location is a characteristic that can be used to identify potentially relevant media clips. For example, a user may associate a particular person, or a geographical area with the media clip object for "GOLF INSTRUCTIONS." When a media signal includes data, or is associated with another signal indicating the user was at a particular location or in the proximity of a particular person at the time the media clip was generated and captured, the memory assistance server 10 can use that information to determine the relevancy of the media clip.

It will be appreciated by those skilled in the art, that the above-mentioned characteristics may be combined in different ways to create different criteria for selecting, ranking and organizing media clips. Furthermore, because the individual sensors used in the system may not always calculate or determine a particular characteristic with 100% certainty, probabilistic reasoning may be used. Accordingly, media clip selection and creation may be based on a determination that a measure of one or more characteristics equals or exceeds a threshold value. For example, in one embodiment, the measure of a characteristic may be expressed as a probability. Accordingly, the signal processing server may generate a media clip associated with the label "GOLF INSTRUCTIONS" by combining evidence from various characteristics (e.g., a portion of the media clip includes a particular keyword (e.g., "swing") with a certain probability, includes the golf instructors voice with a certain probability, and is generated at a certain location with a certain probability). In one embodiment, the probability measure associated with each characteristic can be combined to determine the probability that the media clip should be associated with a media object for "GOLF INSTRUCTION." In an alternative embodiment, a media clip may be generated or assigned to a particular media object when a probability measure associated with each characteristic exceeds a predetermined minimum threshold value associated with the particular characteristic. In any case, combining characteristics with various probabilities may be used to build queries for each media clip object. It will also be appreciated by those skilled in the art that combining evidence from various sources to determine a conclusion may be implemented using one or more other techniques, such as perceptrons, neural networks, Bayesian networks, decision trees, or various combinations of these.

Figure 6:
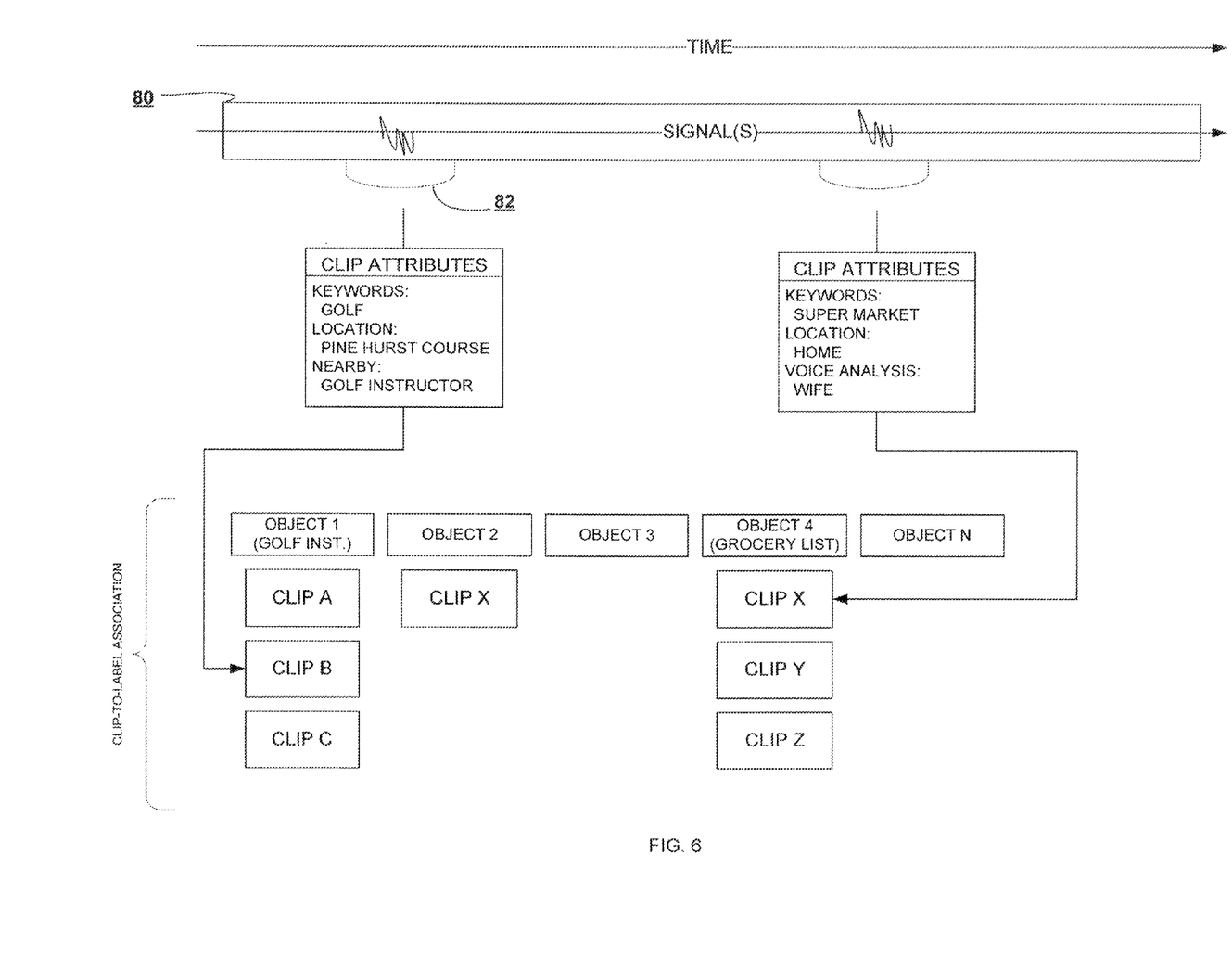
FIG. 6 illustrates an example of how a signal is processed by a memory assistance server, according to an embodiment of the invention.

FIG. 6 shows an example of the process by which media clips are identified and organized, according to an embodiment of the invention. As media signals are received by the signal processing logic, various signal analysis components analyze the media signal to determine whether the media signal has particular characteristics. For instance, the speech processing module may analyze the media signal to determine the existence of key words or phrases in the media signal. Based on this analysis, portions of the media signal may be associated with one or more media clip objects, such as objects 1-N shown in FIG. 6. In one embodiment of the invention, as portions of the media signal with relevant characteristics are identified, the portions are extracted or "clipped" to make media clips. Various conventional methods can be used to generate the media clips. For example, a variety of analysis and algorithms might be used to determine the exact portion of a signal that is included in a particular clip. In one embodiment, the clipping operation will be dependent upon the particular memory problem being addressed, such that certain clips are generally longer than others, and vice versa, depending on the memory problem being addressed. Alternatively, meta-data may be generated to indicate what portions of the media signal have certain characteristics. Accordingly, a later search of the stored media signal can be done based on the meta-data generated during the initial analysis.

As illustrated in FIG. 6, the media signal 80 includes a first portion that has characteristics that satisfy the parameters set out by media object 1. For example, the portion of media signal 80 indicated by reference number 82 has been identified to include characteristics satisfying the parameters set forth by media clip object 1 for "GOLF INSTRUCTIONS." Specifically, the portion of the media signal includes the word "golf", the location "Pine Hurst Course" with a golf instructor nearby. The proximity to the golf instructor may be determined, for example, by a Bluetooth® signal transmitted by the golf instructor's mobile phone device, and detected by the user's mobile phone. In any case, because that portion of the media signal satisfies the attributes or parameters set out by media object 1, a media clip (e.g., media clip B) is generated and associated with media object 1. As described above, the media clip organizer 66 may arrange or rank the media clips in order of their overall relevance as it relates to media clip object 1.

In addition, to the portion of the media signal satisfying the parameters for media object 1, a second portion of the media signal satisfies the attributes for media object 4 for the "GROCERY LIST" object. Accordingly, a media clip (e.g., media clip X) is generated for media clip object 4 for the "GROCERY LIST."

A few examples of how the system may operate are provided. In one embodiment of the invention, the memory assistance server 10 has several modes of operation. For instance, in one embodiment, a user may Issue a directive or command to the memory assistance server 10. For example, a user may establish a communication session with the memory assistance server 10, and direct the server 10 to remind the user about several grocery items that the user would like to purchase. The user may speak a command, such as, "remind me to buy bananas, canned tuna, milk, and frozen pizzas." The speech processing module 44 of the memory assistance server 10 will analyze the speech by performing a speech recognition process on the spoken words, and identifying the keywords associated with a grocery list media object. Accordingly, the memory assistance server 10 may categorize the keywords as being associated with a grocery list and generate a media clip associated with a media object for the grocery list. The next time the user is near a grocery store, the presentation logic 44 of the memory assistance server may initiate a reminder notification to remind the user of the grocery list. The user's location may be determined by location information provided by the user's smart phone. The location analysis component of the memory assistance server 10 will analyze the location information to determine if the user is in the general proximity of a grocery store, and if so, the memory assistance server 10 will initiate a reminder process, to communicate the grocery list media clip to the user.

In another example, the user records a conversation with his or her golf instructor during a golf lesson. After the golf lesson, the user communicates the recorded media file to the memory assistance server 10, which analyzes the media file and identifies keywords indicating that a portion of the media file should be associated with a media object established for golf lessons. Prior to the user's next golf outing, the user can perform a search for all media clips associated with golf lessons. For instance, the user may simply select all media clips associated with the "GOLF INSTRUCTIONS" media object, or else the user may specify search parameters for a general search of all stored media. In any case, the memory assistance server will present the proper media clips to the user to refresh the user's memory about the golf lessons.

It will be appreciated by those skilled in the art that the various components of the system described herein may be implemented in hardware, software, or a combination thereof. Similarly, various embodiments of the invention may include only subsets of the entire functionality described herein, without departing from the spirit of the invention.

The foregoing description of various implementations of the invention has been presented for purposes of illustration and description. It is not exhaustive and does not limit the invention to the precise form or forms disclosed. A speech recognition system consistent with an embodiment of the invention may take one of several form factors. Furthermore, It will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. Software may be both object-oriented and non-object-oriented. The scope of the invention is defined by the claims and their equivalents.

What is claimed is:

1. A memory assistance system, comprising:
   a signal processing server that:
      receives an input signal, said input signal comprising a media signal and associated data, and relating to information to be remembered by a user; and
      processes the input signal to identify characteristics of the media signal relevant to aiding the user to remember the information;
   presentation logic that:
      generates, based on said identified characteristics at least one media clip from a portion of the media signal; and
      determines a time and medium to present the media clip to the user so as to aid the user in remembering the information; and
   a speech processing module, said speech processing module comprising:
      a speech recognition component; and
      a text analysis component; wherein,
   the presentation logic generates the at least one media clip from a portion of the media signal that includes a textual word identified, from speech included in the media signal, by the speech recognition component, and the text analysis component determines that the identified textual word matches a keyword.

2. A memory assistance system, comprising:
   a signal processing server that:
      receives an input signal, said input signal comprising a media signal and associated data, and relating to information to be remembered by a user; and
      processes the input signal to identify characteristics of the media signal relevant to aiding the user to remember the information;
   presentation logic that:
      generates, based on said identified characteristics at least one media clip from a portion of the media signal; and
      determines a time and medium to present the media clip to the user so as to aid the user in remembering the information; and
   a date/time analysis component that determines the date/time at which a relevant characteristic occurs in the media signal so as to enable the presentation logic to generate the at least one media clip from a portion of the media signal including the relevant characteristic.

3. A memory assistance system, comprising:
   a signal processing server that:
      receives an input signal, said input signal comprising a media signal and associated data, and relating to information to be remembered by a user; and
      processes the input signal to identify characteristics of the media signal relevant to aiding the user to remember the information;
   presentation logic that:
      generates, based on said identified characteristics at least one media clip from a portion of the media signal; and
      determines a time and medium to present the media clip to the user so as to aid the user in remembering the information; and
   a location analysis component that analyzes location information received and associated with the media signal so as to enable the presentation logic to generate the at least one media clip from a portion of the media signal when the location information indicates that the portion of the media signal was generated or captured in proximity to a particular location or person.

4. A memory assistance system, comprising:
   a signal processing server that:
      receives an input signal, said input signal comprising a media signal and associated data, and relating to information to be remembered by a user; and
      processes the input signal to identify characteristics of the media signal relevant to aiding the user to remember the information;
   presentation logic that:
      generates, based on said identified characteristics at least one media clip from a portion of the media signal; and
      determines a time and medium to present the media clip to the user so as to aid the user in remembering the information; and
   a biometric signal processing component that analyzes a biometric signal received along with the media signal so as to enable the presentation logic to generate the at least one media clip from a portion of the media signal when biometric information indicates that the portion of the media signal is relevant to aiding the user in remembering the information.

5. The memory assistance system of claim 4, wherein the biometric information indicates that the portion of the media signal is relevant when the biometric information deviates from a person's normal biometric information.

6. The memory assistance system of claim 4, wherein the biometric information includes information related to one of the following characteristics: a speaker's mood, a speaker's volume, a speaker's voice, a speaker turn-taking rate, a speech rate, a person's gaze, a person's posture, a person's heart rate, a person's blood glucose level, or a measure of a person's galvanic skin response.

7. A memory assistance system, comprising:
   a signal processing server that:
      receives an input signal, said input signal comprising a media signal and associated data, and relating to information to be remembered by a user; and
      processes the input signal to identify characteristics of the media signal relevant to aiding the user to remember the information; and
   presentation logic that:
      generates, based on said identified characteristics at least one media clip from a portion of the media signal; and
      determines a time and medium to present the media clip to the user so as to aid the user in remembering the information,
   wherein the presentation logic includes a search component to facilitate a search for media clips based on search parameters specified by a user, wherein the search component is configured to identify and generate media clips from previously received media signals having characteristics satisfying the search parameters.

8. A memory assistance system, comprising:
a signal processing server that:
receives an input signal, said input signal comprising a media signal and associated data, and relating to information to be remembered by a user; and
processes the input signal to identify characteristics of the media signal relevant to aiding the user to remember the information; and presentation logic that:
generates, based on said identified characteristics at least one media clip from a portion of the media signal; and
determines a time and medium to present the media clip to the user so as to aid the user in remembering the information,
wherein the presentation logic includes a presentation scheduler to enable the user to schedule a time when media clips are to be presented to the user.

9. A memory assistance system, comprising:
a signal processing server that:
receives an input signal, said input signal comprising a media signal and associated data, and relating to information to be remembered by a user; and
processes the input signal to identify characteristics of the media signal relevant to aiding the user to remember the information; and
presentation logic that:
generates, based on said identified characteristics at least one media clip from a portion of the media signal; and
determines a time and medium to present the media clip to the user so as to aid the user in remembering the information,
wherein the presentation logic includes a presentation scheduler to enable the user to select a location where one or more media clips are to be presented to the user, when the user is at or near the location.

10. The memory assistance system of claim 9, wherein the presentation logic receives location information in real-time from the user's communication device and analyzes the location information to determine whether the location information indicates the user is at or near a particular location for which the user has previously scheduled media clips to be presented.

11. A memory assistance system, comprising:
a signal processing server that:
receives an input signal, said input signal comprising a media signal and associated data, and relating to information to be remembered by a user; and
processes the input signal to identify characteristics of the media signal relevant to aiding the user to remember the information; and
presentation logic that:
generates, based on said identified characteristics at least one media clip from a portion of the media signal; and
determines a time and medium to present the media clip to the user so as to aid the user in remembering the information,
wherein the presentation logic includes a presentation scheduler to enable the user to schedule media clips to be presented to the user when one or more biometric signals indicate the user is in a particular state or experiencing a particular condition as indicated by the one or more biometric signals.

12. The memory assistance system of claim 11, wherein the presentation logic receives a biometric signal in real-time from the user's communication device and analyzes the biometric signal to determine whether the biometric signal indicates the user is in a particular state or experiencing a particular condition for which the user has previously scheduled media clips to be presented.

13. A memory assistance system, comprising:
a signal processing server that:
receives an input signal, said input signal comprising a media signal and associated data, and relating to information to be remembered by a user; and
processes the input signal to identify characteristics of the media signal relevant to aiding the user to remember the information;
presentation logic that:
generates, based on said identified characteristics at least one media clip from a portion of the media signal; and
determines a time and medium to present the media clip to the user so as to aid the user in remembering the information; and
a location analysis component that analyzes location information indicating a current location of the user, so as to enable the presentation logic to present one or more media clips to the user when the current location is within proximity of a particular location or person.

14. A memory assistance system, comprising:
a signal processing server that:
receives an input signal, said input signal comprising a media signal and associated data, and relating to information to be remembered by a user; and
processes the input signal to identify characteristics of the media signal relevant to aiding the user to remember the information;
presentation logic that:
generates, based on said identified characteristics at least one media clip from a portion of the media signal; and
determines a time and medium to Present the media clip to the user so as to aid the user in remembering the information; and
a biometric signal processing component to analyze biometric information included in a biometric signal associated with the user, so as to enable the presentation logic to present one or more media clips to the user when the biometric information indicates the user is in a particular state or experiencing a particular condition.

15. A memory assistance system, comprising:
a signal processing server that:
receives an input signal, said input signal comprising a media signal and associated data, and relating to information to be remembered by a user; and
processes the input signal to identify characteristics of the media signal relevant to aiding the user to remember the information; and
presentation logic that:
generates, based on said identified characteristics at least one media clip from a portion of the media signal; and
determines a time and medium to present the media clip to the user so as to aid the user in remembering the information,
wherein the presentation logic is configured to determine a method and means by which one or more media clips are to be presented to the user, and said means is selected from the following: a telephone, an email, a voicemail message, a text message, an SMS message, an MMS message, an instant message, a softphone.

16. The memory assistance system of claim 15, wherein, in determining a method and means by which one or more media clips are to be presented to the user, the presentation logic analyzes data received from one of the following data sources: a communication device, a network-connected device executing a calendaring or contact management application, a local database storing a user's calendaring and/or personal contacts information.

17. A method, comprising:
receiving, at a signal processing server, an input signal, said input signal comprising a media signal and associated data relating to information to be remembered by a user,
processing the input signal to identify characteristics of the media signal relevant to aiding the user to remember the information;
storing the received input signal along with results from said processing;
generating, based on said identified characteristics, at least one media clip from a portion of the media signal;
determining a time and medium to present the media clip to the user; and
presenting the media clip to the user so as to aid the user in remembering the information,
wherein processing the input signal to identify characteristics includes:
identifying textual words from speech included within the media signal, and analyzing the textual words to determine whether the textual words match keywords associated with a particular topic: and
generating the at least one media clip from one or more portions of the media signal including textual words that match keywords associated with the particular topic.

18. A method, comprising:
receiving, at a signal processing server, an input signal, said input signal comprising a media signal and associated data relating to information to be remembered by a user,
processing the input signal to identify characteristics of the media signal relevant to aiding the user to remember the information;
storing the received input signal alone with results from said processing:
generating, based on said identified characteristics, at least one media clip from a portion of the media signal;
determining a time and medium to present the media clip to the user; and
presenting the media clip to the user so as to aid the user in remembering the information,
wherein processing the input signal to identify characteristics includes:
analyzing date/time information to determine the date/time at which a relevant characteristic occurs in a media signal; and
generating the at least one media clip from a portion of the media signal including the relevant characteristic occurring at a particular date/time.

19. A method, comprising:
receiving, at a signal processing server, an input signal, said input signal comprising a media signal and associated data relating to information to be remembered by a user,
processing the input signal to identify characteristics of the media signal relevant to aiding the user to remember the information;
storing the received input signal along with results from said processing;
generating, based on said identified characteristics, at least one media clip from a portion of the media signal;
determining a time and medium to present the media clip to the user; and
presenting the media clip to the user so as to aid the user in remembering the information,
wherein processing the input signal to identify characteristics includes:
analyzing location information received with the media signal to identify a location associated with a portion of the media signal; and
generating the at least one media clip from one or more portions of the media signal when the location information indicates that the portion of the of the media signal was generated or captured at or near a relevant location.

20. A method, comprising:
receiving, at a signal processing server, an input signal, said input signal comprising a media signal and associated data relating to information to be remembered by a user,
processing the input signal to identify characteristics of the media signal relevant to aiding the user to remember the information;
storing the received input signal alone with results from said processing;
generating, based on said identified characteristics, at least one media clip from a portion of the media signal;
determining a time and medium to present the media clip to the user; and
presenting the media clip to the user so as to aid the user in remembering the information,
wherein processing the input signal to identify characteristics includes;
analyzing a biometric signal received along with the media signal; and
generating the at least one media clip from one or more portions of the media signal when biometric information from the biometric signal indicates that the portion of the of the media signal is relevant to aiding the user in recalling and/or reinforcing an existing memory of a particular event or fact.

21. The method of claim 20, wherein the biometric information indicates that the portion of the media signal is relevant when the biometric information deviates from a person's normal biometric information.

22. The method of claim 20, wherein the biometric information includes information related to one of the following characteristics: a speaker's mood, a speaker's volume, a speaker's voice, a speaker turn-taking rate, a speech rate, a person's gaze, a person's posture, a person's heart rate, a person's blood glucose level, or a measure of a person's galvanic skin response.

23. A method, comprising:
receiving, at a signal processing server, an input signal, said input signal comprising a media signal and associated data relating to information to be remembered by a user,
processing the input signal to identify characteristics of the media signal relevant to aiding the user to remember the information;
storing the received input signal along with results from said processing;
generating, based on said identified characteristics, at least one media clip from a portion of the media signal;
determining a time and medium to present the media clip to the user;

presenting the media clip to the user so as to aid the user in remembering the information; and facilitating a search for media clips based on search parameters specified by the user by identifying and generating media clips from previously received media signals having characteristics satisfying the user-specified search parameters.

24. The method of claim 23, further comprising:

determining a time when one or more media clips are to be presented to the user.

25. A method, comprising:

receiving, at a signal processing server, an input signal, said input signal comprising a media signal and associated data relating to information to be remembered by a user, processing the input signal to identify characteristics of the media signal relevant to aiding the user to remember the information;

storing the received input signal along with results from said processing;

generating, based on said identified characteristics, at least one media clip from a portion of the media signal;

determining a time and medium to present the media clip to the user;

presenting the media clip to the user so as to aid the user in remembering the information; and determining a location where one or more media clips are to be presented to the user, when the user is at or near the location.

26. A method, comprising:

receiving, at a signal processing server, an input signal, said input signal comprising a media signal and associated data relating to information to be remembered by a user, processing the input signal to identify characteristics of the media signal relevant to aiding the user to remember the information;

storing the received input signal along with results from said processing;

generating, based on said identified characteristics, at least one media clip from a portion of the media signal;

determining a time and medium to present the media clip to the user;

presenting the media clip to the user so as to aid the user in remembering the information; and receiving location information in real-time from the user's communication device and analyzing the location information to determine whether the location information indicates the user is at or near a particular location for which the user has previously scheduled media clips to be presented.

27. A The method, comprising:

receiving, at a signal processing server, an input signal, said input signal comprising a media signal and associated data relating to information to be remembered by a user, processing the input signal to identify characteristics of the media signal relevant to aiding the user to remember the information;

storing the received input signal along with results from said processing;

generating, based on said identified characteristics, at least one media clip from a portion of the media signal;

determining a time and medium to present the media clip to the user;

presenting the media clip to the user so as to aid the user in remembering the information; and determining a method and means by which one or more media clips are to be presented to the user, wherein, in determining a method and means by which one or more media clips are to be presented to the user comprises analyzing data received from one of the following data sources: a communication device, a network-connected computer executing a calendaring or contact management application, a local database storing the user's calendaring and/or personal contacts information.

28. A method, comprising:

receiving, at a signal processing server, an input signal, said input signal comprising a media signal and associated data relating to information to be remembered by a user, processing the input signal to identify characteristics of the media signal relevant to aiding the user to remember the information;

storing the received input signal along with results from said processing;

generating, based on said identified characteristics, at least one media clip from a portion of the media signal;

determining a time and medium to present the media clip to the user;

presenting the media clip to the user so as to aid the user in remembering the information; and selecting a means to present one or more media clips from the following: a telephone, an email, a voicemail message, a text message, an SMS message, an MMS message, an instant message, a softphone.

* * * * *